(12) United States Patent
Doell et al.

(10) Patent No.: US 9,261,173 B2
(45) Date of Patent: Feb. 16, 2016

(54) LOCKING BRAKE FOR A SEAT ACTUATOR

(71) Applicants: Chris Doell, Valencia, CA (US); Peter Ciulla, Glendate, CA (US)

(72) Inventors: Chris Doell, Valencia, CA (US); Peter Ciulla, Glendate, CA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 473 days.

(21) Appl. No.: 13/729,253

(22) Filed: Dec. 28, 2012

(65) Prior Publication Data

US 2013/0167674 A1     Jul. 4, 2013

Related U.S. Application Data

(60) Provisional application No. 61/581,260, filed on Dec. 29, 2011.

(51) Int. Cl.

| | |
|---|---|
| *F16H 19/00* | (2006.01) |
| *F16H 19/02* | (2006.01) |
| *F16H 19/08* | (2006.01) |
| *B60N 2/02* | (2006.01) |
| *B60N 2/16* | (2006.01) |
| *B60N 2/22* | (2006.01) |
| *B60N 2/44* | (2006.01) |

(52) U.S. Cl.
CPC ............ *F16H 19/00* (2013.01); *B60N 2/0232* (2013.01); *B60N 2/168* (2013.01); *B60N 2/2227* (2013.01); *B60N 2/444* (2013.01); *F16H 19/02* (2013.01); *F16H 19/08* (2013.01); *Y10T 74/188* (2015.01); *Y10T 74/18568* (2015.01)

(58) Field of Classification Search
CPC . Y10T 74/188; Y10T 74/18568; F16H 19/00; F16H 19/08; F16H 19/02; B60N 2/0232; B60N 2/444; B60N 2/2227; B60N 2/168
See application file for complete search history.

(56) References Cited

U.S. PATENT DOCUMENTS

| | | | | |
|---|---|---|---|---|
| 2,783,861 | A | * | 3/1957 | Jungles ............... 192/223.3 |
| 3,155,363 | A | * | 11/1964 | Lohr .................... 248/419 |
| 4,364,536 | A | * | 12/1982 | Kluting ................ 248/429 |
| 4,487,391 | A | | 12/1984 | Rampel et al. |
| 4,822,093 | A | | 4/1989 | Kawai et al. |
| 5,882,075 | A | * | 3/1999 | Partington et al. ....... 297/344.13 |

(Continued)

FOREIGN PATENT DOCUMENTS

EP     0887223 A2     12/1998

OTHER PUBLICATIONS

International Search Report dated Apr. 23, 2013, application No. PCT/US2012/071914.

*Primary Examiner* — David M Fenstermacher
(74) *Attorney, Agent, or Firm* — RatnerPrestia

(57) ABSTRACT

Seat actuators and methods for operating seat actuators are disclosed. A seat actuator comprises an actuator interface, a motor, and a brake. The actuator interface is adapted to be coupled to a corresponding seat interface. The motor is operable to provide a force to the actuator interface. The brake comprises a plurality of interlocking components. The brake is operable to prevent movement of the actuator interface by a mechanical interlocking of the plurality of interlocking components. A method for operating the seat actuator comprises operating a motor of the seat actuator to provide a force to an actuator interface, and operating a brake to prevent movement of the actuator interface by mechanically interlocking a plurality of interlocking components of the brake.

17 Claims, 3 Drawing Sheets

(56) References Cited

U.S. PATENT DOCUMENTS

| | | |
|---|---|---|
| 6,626,064 B1 | 9/2003 | Maue et al. |
| 7,064,506 B2 * | 6/2006 | Stewart et al. ............... 318/293 |
| 7,780,235 B2 * | 8/2010 | Teufel et al. ............. 297/344.15 |
| 8,789,671 B2 * | 7/2014 | Chevalier ..................... 192/48.7 |
| 8,814,122 B2 * | 8/2014 | Couasnon ..................... 248/429 |

* cited by examiner

LOCKING BRAKE FOR A SEAT ACTUATOR

CROSS-REFERENCE TO RELATED APPLICATIONS

The present application claims priority to U.S. Patent Application No. 61/581,260, filed Dec. 29, 2011, the contents of which are incorporated herein by reference in their entirety.

FIELD OF THE INVENTION

The invention relates generally to the field of actuators, and more particularly, to actuators for use with powered seats.

BACKGROUND OF THE INVENTION

In conventional seat actuators, friction brakes have been used to lock the position of the actuator in place. However, concerns have been raised over the use of friction brakes in aircraft seat actuators that must withstand crash loads. One proposed solution has been to use non-brackdriveable worm gears to address this concern. However, the use of these worm gears results in a gear train having a very low efficiency.

SUMMARY OF THE INVENTION

Aspects of the present invention are related to seat actuators and methods for operating seat actuators.

In accordance with one aspect of the present invention, a seat actuator is disclosed. The seat actuator comprises an actuator interface, a motor, and a brake. The actuator interface is adapted to be coupled to a corresponding seat interface. The motor is operable to provide a force to the actuator interface. The brake comprises a plurality of interlocking components. The brake is operable to prevent movement of the actuator interface by a mechanical interlocking of the plurality of interlocking components.

In accordance with another aspect of the present invention, a method for operating a seat actuator is disclosed. The method comprises operating a motor of the seat actuator to provide a force to an actuator interface, and operating a brake to prevent movement of the actuator interface by mechanically interlocking a plurality of interlocking components of the brake.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The embodiments of the invention described herein relate to brake mechanisms for a seat actuator. The disclosed embodiments include brake mechanisms with interlocking components, i.e., components that mechanically interlock in order to prevent movement of the seat actuator. While the embodiments of the present invention are described primarily with respect to actuators for powered seats, it will be understood that the invention is not so limited. The disclosed brake mechanisms may be used in all suitable actuators that may require or benefit from a secure brake mechanism.

The systems and methods described herein are particularly suitable for electrically energized actuators that may need to prevent movement under high stresses or forces. For example, the disclosed embodiments may be desirably used for seat actuators in airplane or automobile seats, in which the seats may experience high accelerations due to sudden movement (or stopping) of their associated vehicles. The actuators described herein may be particularly suitable for preventing movement of the actuator under such high loads.

Figure 1A:
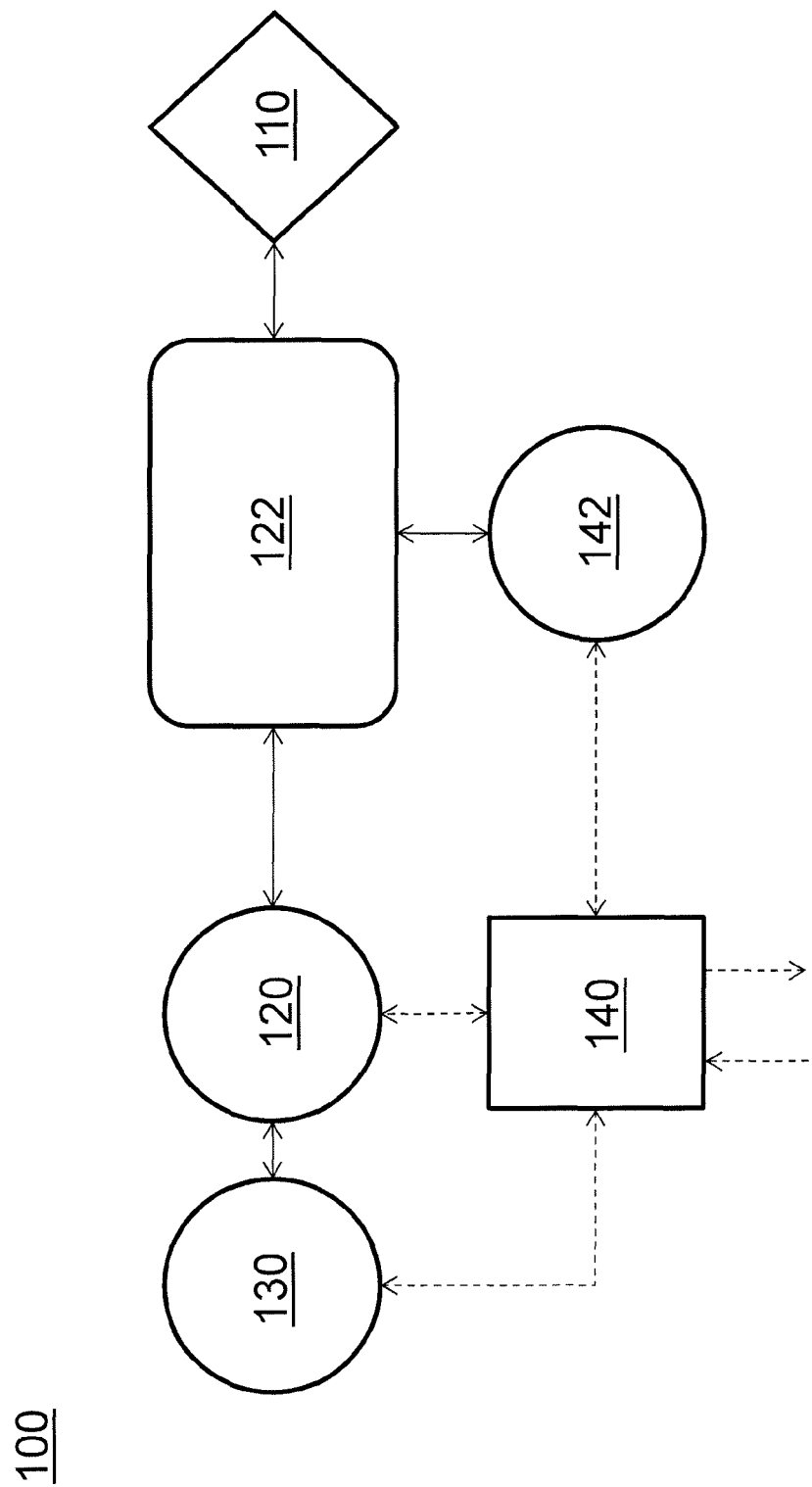
FIG. 1A is a diagram illustrating an exemplary seat actuator in accordance with aspects of the present invention.
Figure 1B:
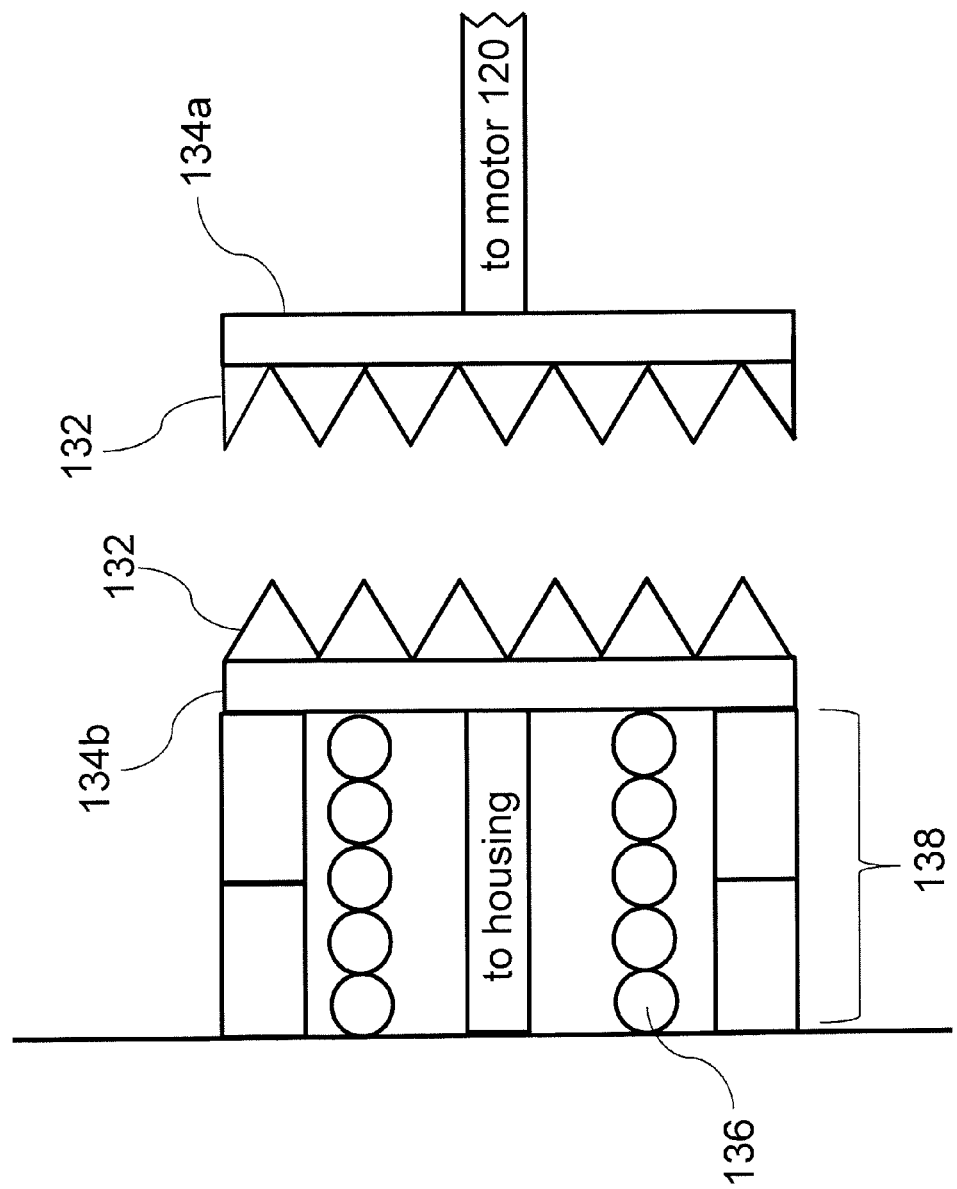
FIG. 1B is a diagram illustrating an exemplary brake of the seat actuator of FIG. 1A.

Referring now to the drawings, FIGS. 1A and 1B illustrate an exemplary seat actuator 100 in accordance with aspects of the present invention. Actuator 100 may be usable to actuate a powered seat, e.g., in an airplane. As a general overview, actuator 100 includes an actuator interface 110, a motor 120, and a brake 130. In FIG. 1A, direct, mechanical couplings between components are shown with solid arrows, while electrical signal coupling between components are shown with dashed arrows. Additional details of actuator 100 are described herein.

Actuator interface 110 is adapted to be coupled to a corresponding seat interface. Actuator 100 is mounted to a seat frame at the location of the corresponding seat interface. When actuator interface 110 mates with the seat interface, actuator interface 110 transmits the power generated by actuator 100 to the seat via the seat interface, in order to generate a desired movement of the seat. Suitable actuator interfaces 110 will be known to one of ordinary skill in the art, and may be selected based on the corresponding seat interface provided on the seat and/or the type of seat movement intended to be generated by actuator 100.

Motor 120 is operable to provide a force to actuator interface 110. Motor 120 may be coupled to actuator interface 110 directly (e.g., via a motor shaft) or indirectly (e.g., via gear train 122, as shown in FIG. 1A). Motor 120 may receive power from a power source that is external from actuator 100, and to which actuator 100 is electrically connected. Alternatively, actuator 100 may include an internal power source (not shown) such as a battery for powering motor 120. Suitable motors for use as motor 120 will be known to one of ordinary skill in the art from the description herein.

Brake 130 is operable to prevent of the actuator interface 110. Brake 130 prevents movement of actuator interface 110 via the connection between motor 120 and actuator interface 110. Accordingly, brake 130 further prevents motor 120 from providing any force to actuator interface 110.

Brake 130 comprises a plurality of interlocking components 132, as shown in FIG. 1B. In an exemplary embodiment, brake 130 comprises a pair of discs 134a and 134b. A first disc 134a is attached to a shaft of motor 120, and a second disc 134b is attached to the housing of actuator 100. The plurality of interlocking components 132 are formed on opposing surfaces of the pair of discs 134a and 134b. In an unlocked position, the interlocking components 132 on first disc 134a do not contact the interlocking components 132 on second disc 134b, and accordingly, first disc 134a is free to rotate along with the shaft of motor 120. In a locked position, the interlocking components 132 on first disc 134a mechanically interlock (or mate) with the interlocking components 132 on second disc 134b, and thereby prevent rotation of first disc 134a and the shaft of motor 120.

In the manner outlined above, brake 130 is operable to prevent movement of actuator interface 110 by preventing movement of motor 120. When brake 130 is in the locked position, the shaft of motor 120 is prevented from rotating (relative to the housing of actuator 100, to which second disc 134b is attached). This restriction in movement is transmitted to the actuator interface 110 via the connection between motor 120 and actuator interface 110 described above. For example, if motor 120 is directly connected to actuator interface 110 (e.g., via the motor shaft), then actuator interface 110 is prevented from movement through its direct connection to the motor shaft. For another example, if motor 120 is indirectly connected to actuator interface 110 (e.g., via gear train 122), then gear train 122 is prevented from movement through is direct connection to the motor shaft, and actuator interface 110 is prevented from movement through its direct connection to gear train 122.

As shown in FIG. 1B, the plurality of interlocking components 132 may comprise a set of mechanical teeth that are configured to mate with each other when brake 130 is placed in a locked position. However, the invention is not so limited. Interlocking components 132 may comprise any structural components having any structure shapes sufficient to prevent relative rotation of the first disc 134a relative to the second disc 134b. Other suitable structures will be known to one of ordinary skill in the art from the description herein.

Brake 130 receives power from an external or an internal power source, substantially as described above with respect to motor 120. It may be desirable that brake 130 be automatically placed in the locked position when in an unpowered state. In an exemplary embodiment, brake 130 comprises a spring element 136. Spring element 136 exerts a force on one half of the plurality of interlocking elements 132 (e.g., on second disc 134b) in order to maintain the plurality of interlocking components 132 in the locked position, e.g., when no power is applied to brake 130. Brake 130 further comprises a magnetic release mechanism 138. Magnetic release mechanism is configured to counteract the force provided by spring element 136 when it receives power. Accordingly, magnetic release mechanism 138 reverses the bias provided by spring element 136, and releases the plurality of interlocking components 132 from the locked position.

Seat actuator 100 is not limited to the above described components, but may include alternative or additional components, as would be understood by one of ordinary skill in the art.

For example, actuator 100 may include a gear train 122. Gear train 122 is coupled to both motor 120 and actuator interface 110. Gear train 122 transmits the force generated by motor 120 to actuator interface 110. As set forth above, gear train 122 couples motor 120 to actuator interface 110 in a force-transmissive manner; in other words, when motor 120 is prevented from movement (i.e. by brake 130), actuator interface 110 is prevented from movement. Gear train 122 may be configured to provide either a rotary force or a linear force to actuator interface 110 depending on the corresponding seat interface and the intended use of actuator 100.

For another example, actuator 100 may include an actuator controller 140. Actuator controller 140 controls the operation of the components of actuator 100. In particular, actuator controller 140 may control the operation of actuator 100 based on received signals. In an exemplary embodiment, actuator controller 140 is adapted to receive a signal representing a desired seat movement. Actuator controller 140 receives data through one or more connectors. The signal may be generated by a centralized controller, by a user input, or may represent a preset seat position stored in a memory of actuator controller 140. Where actuator controller 140 receives signals from an external source, actuator controller 140 may require only a subset of the data for controlling a particular seat movement, for example, where a seat includes a plurality of seat actuators 100 for performing different seat movements or for coordinating on the same movement of the seat.

Upon receipt of the signal, actuator controller 140 is configured to control motor 120 to provide the force to actuator interface 110 based on the received signal. Alternatively, actuator controller 140 is configured to operate brake 130 to be in the locked or unlocked position based on the received signal. Actuator controller 140 may further include a potentiometer 142 configured to provide feedback on the movement of the seat to actuator controller 140. This feedback may be used to refine the control of motor 120 and/or brake 130 to match the desired movement indicated by the received signal.

It may be particularly desirable that motor 120 not be operated when brake 130 is in the locked position, and/or that brake 130 not be placed in the locked position when motor 120 is operating. This may be desirable in order to prevent damage to motor 120 or brake 130. Accordingly, actuator controller 140 may be configured to incorporate a delay between operation of these components in order to prevent the components from being operated simultaneously. In an exemplary embodiment, actuator controller 140 is programmed to operate motor 120 only after a predetermined period of time following operation of brake 130 to be in an unlocked position. Likewise, actuator controller 140 is programmed to operate brake 130 to be in a locked position only after a predetermined period of time following operation of motor 120 to stop moving (i.e. stop providing the force to actuator interface 110).

Where actuator 100 does not include an actuator controller 140, control of the components of actuator 100 may be provided by a centralized controller separate from actuator 100 and configured to control the operation of multiple seat actuators.

Figure 2:
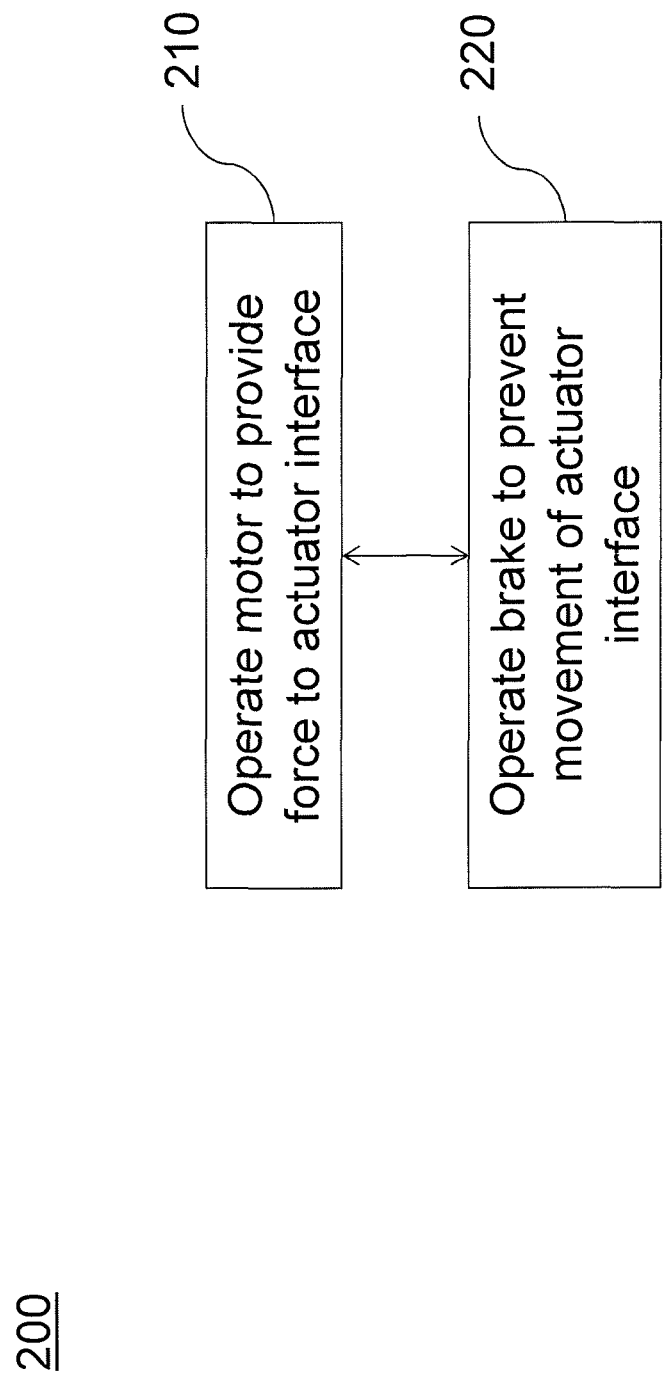
FIG. 2 is a flowchart illustrating an exemplary method for operating a seat actuator in accordance with aspects of the present invention.

FIG. 2 illustrates an exemplary method 200 for operating a seat actuator in accordance with aspects of the present invention. Method 200 may be performed by to actuate a powered seat, e.g., in an airplane. As a general overview, method 200 includes operating a motor to provide force to an actuator interface, and operating a brake to prevent movement of the actuator interface. Additional details of method 200 are described herein with respect to seat actuator 100.

In step 210, a motor of the actuator is operated. In an exemplary embodiment, motor 120 of actuator 100 is operated to provide a force to actuator interface 110. As set forth above, motor 120 may provide the force to actuator interface 110 directly (e.g., via a motor shaft) or indirectly (e.g., via gear train 122, as shown in FIG. 1A).

In step 220, a brake of the actuator is operated. In an exemplary embodiment, brake 130 of actuator 100 is operated to prevent movement of actuator interface 110 by mechanically interlocking the plurality of interlocking components 132 of brake 130. As shown in FIG. 1B, the interlocking components 132 on first disc 134*a* mechanically interlock (or mate) with the interlocking components 132 on second disc 134*b*, and thereby prevent rotation of first disc 134*a* and the shaft of motor 120. This restriction in movement is transmitted to the actuator interface 110 via the connection between motor 120 and actuator interface 110 described above.

As set forth above, it may be particularly desirable that motor 120 not be operated when brake 130 is in the locked position, and/or that brake 130 not be placed in the locked position when motor 120 is operating. Accordingly, step 210 may comprise operating the motor only after a predetermined period of time following operation of the brake to be in an unlocked position. Likewise, step 220 may comprise operating the brake to be in a locked position only after a predetermined period of time following operation of the motor to stop providing a force to the actuator interface.

Method 200 is not limited to the above described steps, but may include alternative or additional steps, as would be understood by one of ordinary skill in the art.

For example, in the embodiment in which brake 130 comprises spring element 136 and magnetic release mechanism 138, method 200 may comprise the steps of maintaining the plurality of interlocking components 132 in a locked position when brake 130 is in an unpowered state, and operating magnetic release mechanism 138 in order to release the plurality of interlocking components 132 from the locked position.

For another example, in the embodiment in which actuator 100 comprises actuator controller 140, method 200 may comprise the steps of receiving a signal representing a desired seat movement, and operating motor 120 and/or brake 130 based on the received signal. As set forth above, actuator controller 140 may be configured to control motor 120 to provide the force to actuator interface 110 based on the received signal. Alternatively, actuator controller 140 may be configured to operate brake 130 to be in the locked or unlocked position based on the received signal.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A seat actuator for a vehicle seat comprising:
a motor having an output shaft operable to move the vehicle seat; and
a brake comprising a plurality of interlocking components, the brake operable to prevent rotation of the output shaft of the motor by mechanical interlocking of the plurality of interlocking components, the plurality of interlocking components comprising a set of mechanical teeth, one subset of the set of mechanical teeth fixedly connected to a housing of the seat actuator and the other subset of the set of mechanical teeth connected to the output shaft of the motor,
wherein, in an unpowered state of the seat actuator, the subsets of mechanical teeth are engaged together to prevent rotation of the output shaft, and in a powered state of the seat actuator, the subsets of mechanical teeth are disengaged to permit rotation of the output shaft.

2. The seat actuator of claim 1, wherein the brake comprises a spring element for maintaining the plurality of interlocking components in a locked position.

3. The seat actuator of claim 2, wherein the brake comprises a magnetic release mechanism for releasing the plurality of interlocking components from the locked position.

4. The seat actuator of claim 1, further comprising an actuator controller adapted to receive a signal representing a desired seat movement, and operable to control the motor based on the received signal.

5. The seat actuator of claim 4, wherein the actuator controller is further operable to control operation of the brake.

6. The seat actuator of claim 5, wherein the actuator controller is programmed to operate the motor only after a predetermined period of time following operation of the brake to be in an unlocked position.

7. The seat actuator of claim 5, wherein the actuator controller is programmed to operate the brake to be in a locked position only after a predetermined period of time following operation of the motor to stop providing the force.

8. The seat actuator of claim 4, wherein the received signal is generated by a user input.

9. The seat actuator of claim 1, wherein the brake comprises a pair of discs, and the plurality of interlocking components are formed on opposing surfaces of the pair of discs.

10. A method for operating a seat actuator of a vehicle seat comprising:
operating an output shaft of a motor of the seat actuator to move the vehicle seat; and
operating a brake to prevent rotation of the output shaft of the motor by mechanically interlocking a plurality of interlocking components of the brake, the plurality of interlocking components comprising a set of mechanical teeth, one subset of the set of mechanical teeth fixedly connected to a housing of the seat actuator and the other subset of the set of mechanical teeth connected to the output shaft of the motor.

11. The method of claim 10, further comprising the steps of:
maintaining the plurality of interlocking components in a locked position when the brake is in an unpowered state; and
operating a magnetic release mechanism in order to release the plurality of interlocking components from the locked position.

12. The method of claim 10, wherein the step of operating the motor comprises operating the motor only after a predetermined period of time following operation of the brake to be in an unlocked position.

13. The method of claim 10, wherein the step of operating the brake comprises operating the brake to be in a locked position only after a predetermined period of time following operation of the motor to stop providing the force.

14. The method of claim 10, further comprising the steps of:
receiving a signal representing a desired seat movement; and
operating the motor and/or operating the brake based on the received signal.

15. A seat actuator for a vehicle seat comprising:
a motor having an output shaft operable to move the vehicle seat; and
a brake comprising a plurality of interlocking components, the brake operable to prevent rotation of the output shaft of the motor by mechanical interlocking of the plurality of interlocking components, the plurality of interlocking components comprising a set of mechanical teeth, one subset of the set of mechanical teeth fixedly connected to a housing of the seat actuator and the other subset of the set of mechanical teeth connected to the output shaft of the motor, wherein, in an locked state of the brake, the subsets of mechanical teeth are engaged together to prevent rotation of the output shaft, and in an unlocked state of the brake, the subsets of mechanical teeth are disengaged to permit rotation of the output shaft.

16. The seat actuator of claim 15, wherein in an unpowered state of the seat actuator, the brake is automatically placed in the locked position.

17. The seat actuator of claim 15, wherein the brake comprises a spring element for maintaining the plurality of interlocking components in the locked position.

* * * * *